(12) United States Patent (10) Patent No.: US 9,113,383 B2
Cazanas et al. (45) Date of Patent: Aug. 18, 2015

(54) CALL CONTINUITY USING SHORT-RANGE COMMUNICATIONS HANDOFF

(71) Applicant: Cellco Partnership, Basking Ridge, NJ (US)

(72) Inventors: Carlos A. Cazanas, Bethlehem, PA (US); Kalpan S. Shah, Bridgewater, NJ (US); Phillip A. Leone, Frenchtown, NJ (US); Victor M. Pagan, Breinigsville, PA (US)

(73) Assignee: Cellco Partnership, Basking Ridge, NJ (US)

( * ) Notice: Subject to any disclaimer, the term of this patent is extended or adjusted under 35 U.S.C. 154(b) by 90 days.

(21) Appl. No.: 14/087,681

(22) Filed: Nov. 22, 2013

(65) Prior Publication Data

US 2015/0146683 A1 May 28, 2015

(51) Int. Cl.
*H04W 4/00* (2009.01)
*H04W 36/00* (2009.01)
(Continued)

(52) U.S. Cl.
CPC .......... *H04W 36/18* (2013.01); *H04L 65/1016* (2013.01); *H04M 7/0006* (2013.01); *H04W 4/008* (2013.01)

(58) Field of Classification Search
CPC ..... H04L 5/0037; H04L 5/0073; H04L 12/56; H04L 12/2834; H04L 41/00; H04L 43/50; H04L 47/14; H04L 47/76; H04L 49/15; H04L 63/1408; H04L 65/1016; H04L 65/1069; H04L 65/1083; H04L 65/80; H04L 67/1091; H04L 67/14; H04L 67/18; H04L 67/26; H04L 69/14; H04L 69/18; H04L 69/24; H04W 4/008; H04W 4/02; H04W 4/021; H04W 4/023; H04W 4/025; H04W 24/00; H04W 24/08; H04W 28/10; H04W 36/00; H04W 36/0016; H04W 36/0055; H04W 36/0083; H04W 36/08; H04W 36/14; H04W 36/18; H04W 36/22; H04W 36/24; H04W 36/30; H04W 48/04; H04W 64/00; H04W 72/00; H04W 76/02; H04W 84/005; H04W 84/045; H04W 88/06; H04W 92/02; H04W 92/20; H04B 1/006; H04M 1/6041; H04M 1/6066; H04M 1/72505; H04M 1/72519; H04M 15/8033; H04M 2250/02; H04M 2250/08; H04R 5/033; H04N 21/43615; G08C 17/02; G01S 19/14; G01S 5/0263; G01S 5/0289
USPC ......... 370/229–240, 252, 310–350, 400–401, 370/431–437, 462–465; 455/421–466
See application file for complete search history.

(56) References Cited

U.S. PATENT DOCUMENTS 8,134,949 B2 * 3/2012 Ruuska et al. ................ 370/328
8,611,813 B1 * 12/2013 Harvey et al. ................ 455/13.1

(Continued)

OTHER PUBLICATIONS

Scalisi, Silvia; University of Trento; "IMS Release 10 Tutorial"; http://disi.unitn.it/locigno/didattica/AdNet/10-11/IMS_Tutorial_Scalisi.pdf, Oct. 2011.

Primary Examiner — Tri H Phan

(57) ABSTRACT

A call is made from a user equipment (UE) device to a first other UE device that is paired to a short range communications device. The first other UE device monitors the respective connections between short range communications device and the first other UE device and a second other UE device and automatically hands over the telephone call from the first other UE device to the second other UE device when the connection between the short range communications device and the second other UE device is stronger than the connection between the short-range communications device and the other first UE device. The cordless headset 172 is concurrently handed off from the first other UE device to the second other UE device.

20 Claims, 6 Drawing Sheets

(51) Int. Cl.
*H04W 36/18* (2009.01)
*H04L 29/06* (2006.01)
*H04M 7/00* (2006.01)

(56) References Cited

U.S. PATENT DOCUMENTS

| | | | |
|---|---|---|---|
| 2004/0009749 A1* | 1/2004 | Arazi et al. | 455/41.2 |
| 2009/0116443 A1* | 5/2009 | Walker et al. | 370/329 |
| 2010/0291928 A1 | 11/2010 | Valdez | |
| 2010/0312896 A1 | 12/2010 | Ait-Ameur et al. | |
| 2013/0019021 A1 | 1/2013 | Lau et al. | |
| 2013/0024574 A1 | 1/2013 | Lau et al. | |
| 2013/0094444 A1 | 4/2013 | Lai et al. | |
| 2014/0269614 A1* | 9/2014 | Maguire et al. | 370/331 |
| 2014/0282967 A1* | 9/2014 | Maguire et al. | 726/7 |

* cited by examiner

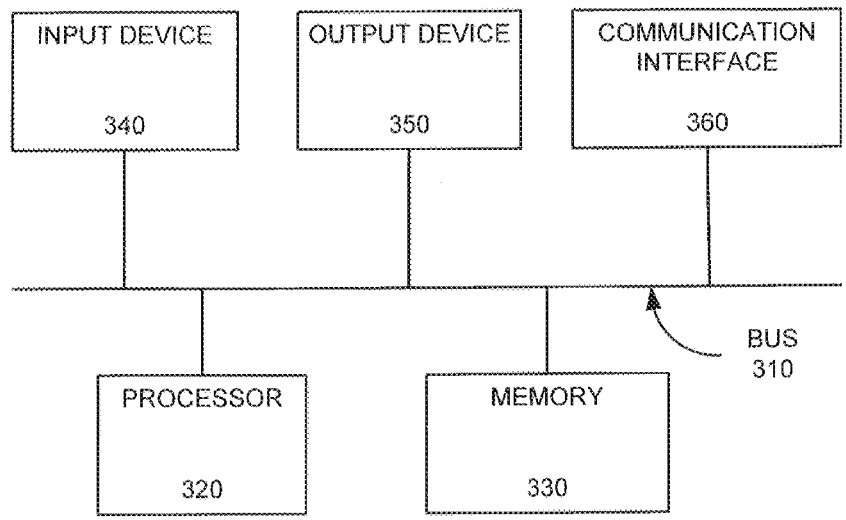
*FIG. 3*
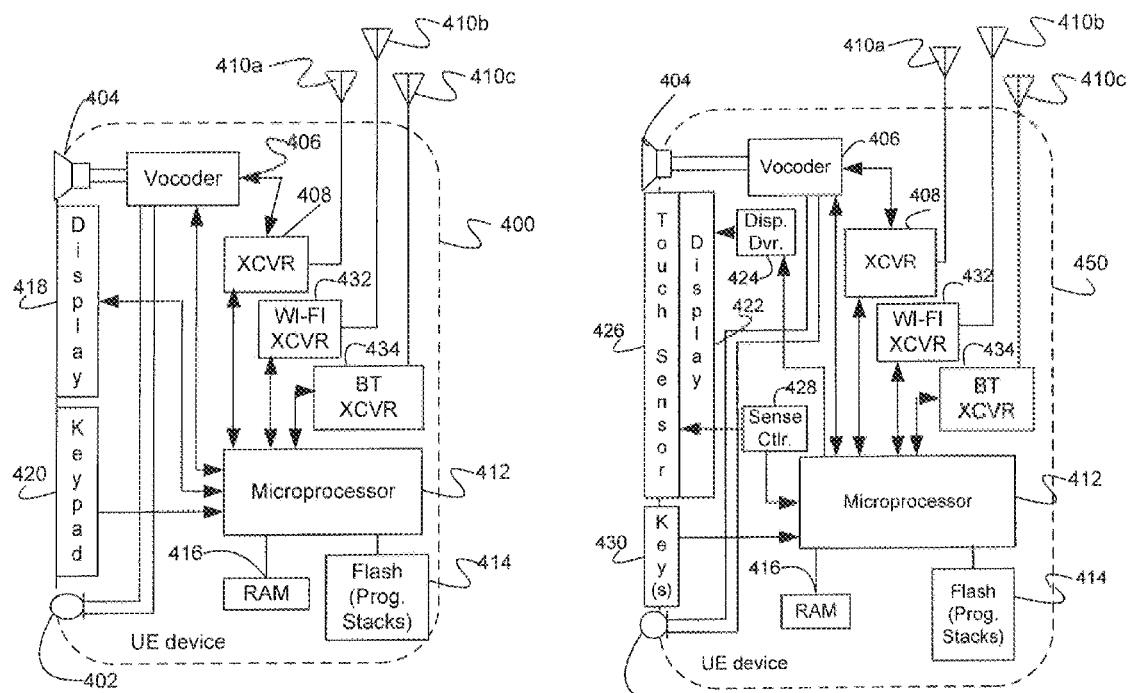
*FIG. 4A*  *FIG. 4B*

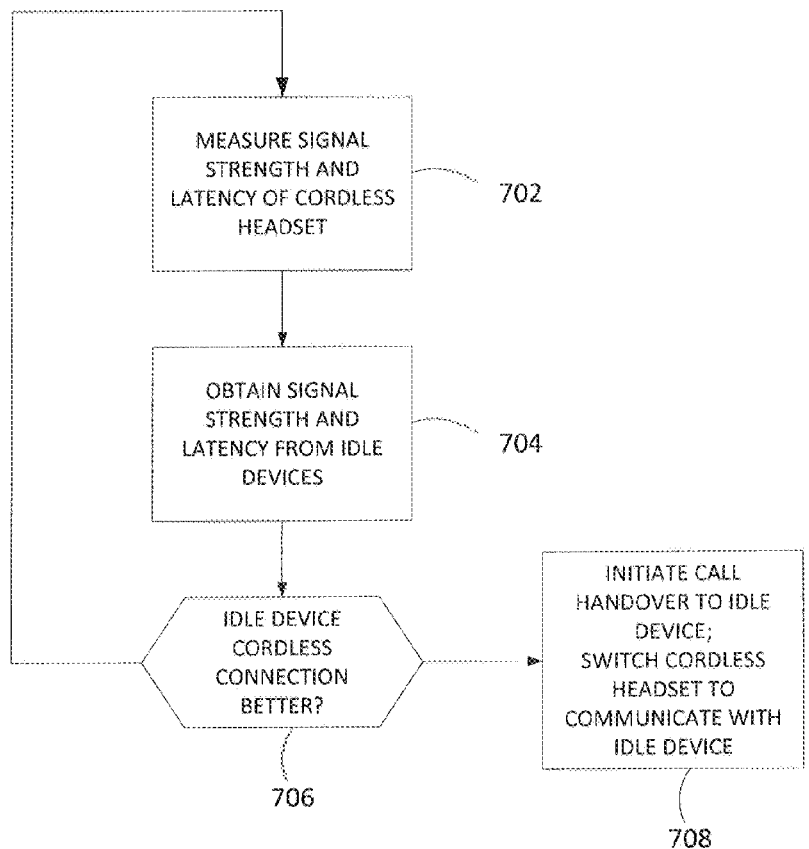

CALL CONTINUITY USING SHORT-RANGE COMMUNICATIONS HANDOFF

BACKGROUND

Many business and consumer users are turning to cordless headsets for use with their mobile devices for voice communications. A cordless headset is typically a wireless, hands-free device that works in conjunction with a mobile device to provide the equivalent functionality of a telephone (i.e. two-way voice communication). People often use a cordless headset while driving, walking, riding a train, etc. As an added incentive, any states and local municipalities have enacted laws banning the use of mobile devices while driving unless the driver is using a cordless headset.

Many people who use their cordless headsets for telephone conversations during their commutes continue their conversations after they have arrived at home or work following their commute and may want to switch from using their mobile device to their home or office telephone. This, however, can be both time consuming and troublesome, thereby encouraging a person to continue using their mobile device instead. Of course, using a mobile device in a building can be problematic itself, as the walls of office buildings, apartment buildings and houses may interfere with a wireless phone's reception, possibly degrading the quality of service. Additionally, should a person switch from using their mobile device to their home or office telephone, they may not be able to continue using their cordless headset, or may need to switch to different headset.

BRIEF DESCRIPTION OF THE DRAWINGS

FIG. 3 is a block diagram of a network device that may be used as one of the elements shown in FIGS. 1 and 2;

FIGS. 4A and 4B are block diagrams of example UE devices;

FIGS. 7A and 7B are flow-chart diagrams for example applications on UE devices.

DETAILED DESCRIPTION

Figure 1:
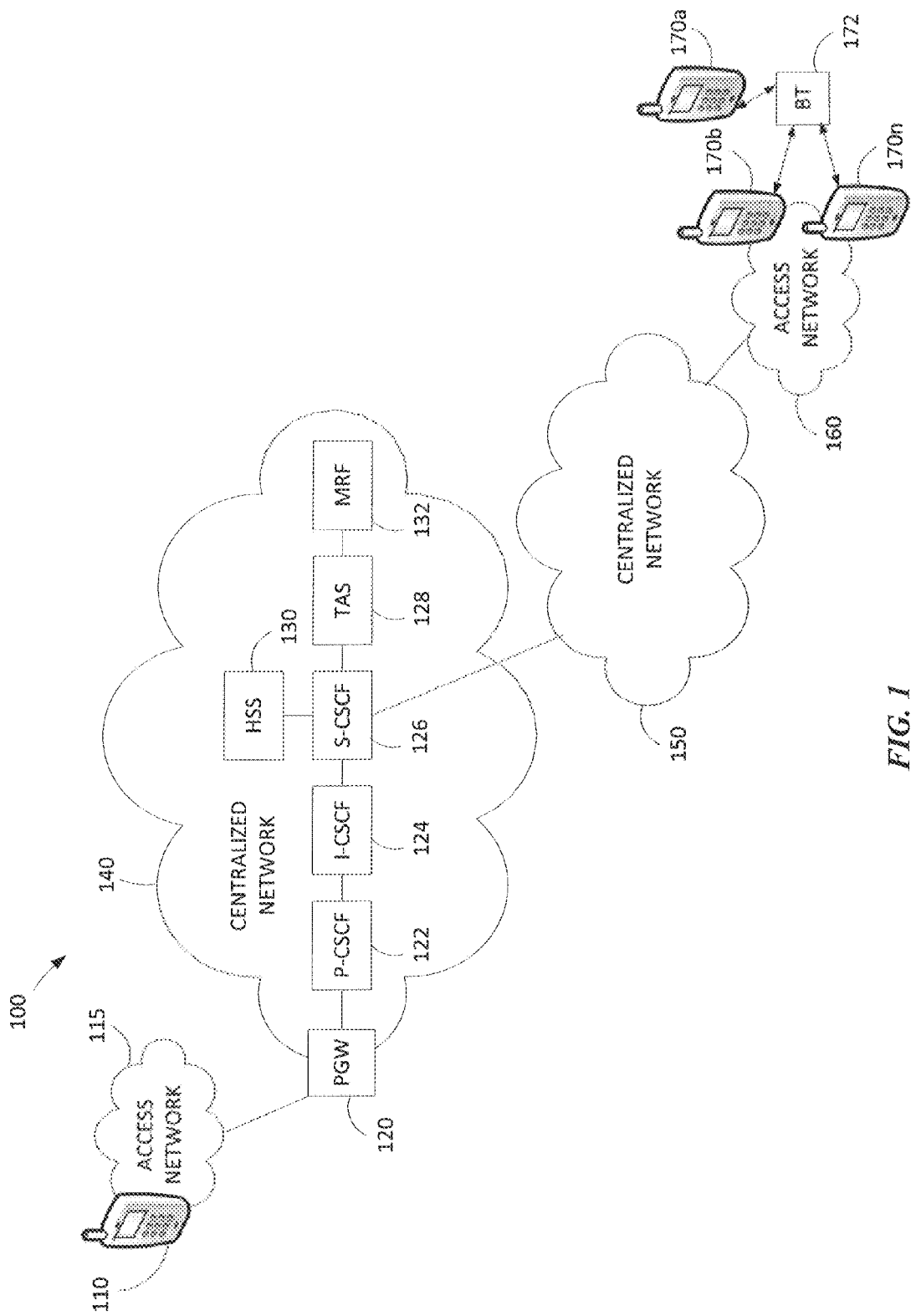
FIG. 1 is a block diagram of a network supporting Internet Protocol (IP) Multimedia Subsystem (IMS) connections between two user equipment (UE) devices one of which employs a short-range communications device such as a cordless headset.

The following detailed description refers to the accompanying drawings. The same labels and/or reference numbers in different drawings may identify the same or similar elements.

The IMS network environments 100 and 200, shown in FIGS. 1 and 2, respectively, are used to implement respective short-range communications handoff schemes described below with reference to FIGS. 5 and 6, respectively. In each of the described examples, a call is made from a first user equipment (UE) device 110 to a second UE device 170a. The example UE devices are wired or wireless devices that are configured to make internet protocol (IP) telephone connections. UE device 170a is paired to a cordless headset, for example, a Bluetooth® device 172. The example systems monitor the connection between device 170a and the cordless headset 172 and automatically hand over the telephone call from the UE device 170a to an idle UE device, for example UE device 170b, to which the headset device 172 is also paired, based on the relative strength and/or latency of the connection between the headset device 172 and each of the UE devices 170a-170n. The cordless headset 172 is concurrently handed off to the new UE device 170b. Although the examples below describe the short-range communications device as a cordless headset, it is contemplated that other types of short-range communications devices, such as a hands-free device in a vehicle. In addition, technologies such as near-field communications or Wi-Fi may be used instead of Bluetooth for the short-range communications device.

FIG. 1 is a diagram of an example environment 100 in which systems and/or methods, described herein, may be implemented. As depicted, environment 100 includes the UE devices 110, and 170a-170n. It also includes access networks 115 and 160 and centralized networks 140 and 150. The centralized networks 140 and 150 each include a gateway 120, a proxy call session control function (Proxy-CSCF, P-CSCF) device 122, an interrogating-CSCF (I-CSCF) device 124, a serving-CSCF (S-CSCF) device 126, a home subscriber server (HSS) 130, a telephony application server TAS 128 and a media resource function (MRF) 132. The MRF 132 may include an MRF controller (MRFC) (not shown) and an MRF processor (MRFP) (not shown). For brevity, these elements are shown only in centralized network 140 but are also found in centralized network 150. While FIG. 1 shows a particular number and arrangement of networks and devices, in alternative implementations, environment 100 may include additional networks or devices, fewer networks or devices, different networks or devices, or differently arranged networks or devices than those depicted in FIG. 1. Operations performed using the network elements are described below with reference to FIGS. 5 and 6.

UE devices 110 and 170a-170n may include any device capable of network communications. For example they may include a corded or cordless telephone, a cell-phone, a smart phone, a laptop computer, a tablet computer, a desktop computer or another type of computing or communications device. Each of the UE devices may have a distinct identifier, such as a mobile directory number (MDN), mobile identification number (MIN) or Uniform Resource Identifier (URI). The example UE devices 110 and 170a-170n are able to connect to one or more access networks 115 and 160 which may have different access technologies.

Each of the access networks 115 and 160 may include any type of network or combination of networks. Examples include a local area network (LAN), a wireless LAN (WLAN) a wide area network (WAN) a wireless WAN (WWAN) (e.g. a Long Term Evolution (LTE) network), a High-Speed Packet Access (HSPA) network, an Evolved High Rate Packet Data (eHRPD) network a fiber optic network, a metropolitan area network (MAN), an ad hoc network or a telephone network (e.g. a public switched telephone network (PSTN). Each of the access networks 115 and 160 may be capable of enabling the UE devices 110 and 170a-170n to communicate with each other or with other devices via the centralized networks 140 and 150.

Similar to access networks 115 and 160, centralized networks 140 and 150 may include any type of network or combination of networks. For instance, each of the centralized networks 140 and 150 may include a LAN, a WLAN, a WAN, or a WWAN. Centralized networks 140 and 150 may include a fiber optic network, a MAN, an ad hoc network, a telephone network, or a voice over Internet protocol (VoIP) network. Each of the centralized networks 140 and 150 may be capable of providing a variety of communication network services, such as registration services, authentication services, authorization services, call session control services, and other types of communication services. In some implementations, centralized networks 140 and 150 include an IP multimedia subsystem (IMS) network, a code division multiple access (CDMA) network, or another type of network capable of a servicing communication sessions. In some implementations, centralized networks 140 and 150 may include a next generation network (NGN) (e.g., an IMS network) and a legacy network (e.g., a CDMA network or other type of network based on technology predating a type of technology upon which the NGN may be based).

The materials that follow describe the PGW 120, P-CSCF 122, I-CSCF 124, S-CSCF 126, TAS 128, HSS 130 and MRF 132 with reference to UE device 110, access network 115 and centralized network 140. This description also applies for the corresponding elements (not shown) in centralized network 150 with reference to UE devices 170a-170n and access network 160.

The access network 115 communicates with the centralized network 140 through a gateway 120, for example, a packet data network (PDN) gateway (PGW). Gateway 120 may include a variety of computing or communication devices. For example, gateway 120 may include a router, a switch, a hub, or another device capable of providing connectivity, security, and/or data transfer services between networks. In addition to providing an interface to access network 115, the example gateway 120 also or alternatively, provides an interface to other networks, such as the Internet. In some implementations, gateway 120 may not be present.

In one implementation, P-CSCF device 122 may include one or more of a variety of computing devices, such as a computer, a server, a cluster of servers, or one or more other types of computing or communication devices. P-CSCF device 122 provides a first point of contact for UE devices 110 accessing centralized network 140 and provides proxy services for UE devices that are registered with the network 140. For example, UE device 110 may attach to P-CSCF device 122 prior to registering with centralized network 140 and/or initiating a communication session.

Similarly, I-CSCF device 124 may include one or more of a variety of computing devices, such as a computer, a server, a cluster of servers, or one or more other types of computing or communication devices. By contrast to P-CSCF device 122 providing proxy services for UE devices 110, I-CSCF device 124 may provide proxy services for centralized network 140. For example, during the registration of UE device 110 with centralized network 140, I-CSCF device 124 communicates with the HSS 130, using a diameter protocol to provide and obtain profile information for UE devices accessing the network 140. The I-CSCF 124 may assign or identify a serving control function (e.g., a function of S-CSCF device 126) for serving UE device 110 based on subscriber information retrieved from the HSS 130, which may provide for load balancing or other network optimization opportunities within centralized network 140.

S-CSCF device 126 may also include one or more of a variety of computing devices, including a computer, a server, a cluster of servers, or one or more other types of computing or communication devices. S-CSCF device 126 may route communication messages within centralized network 140 and/or establish routing paths for session requests and/or communication sessions. S-CSCF device 126 may also, or alternatively, assist in registering UE devices 110 with centralized network 140. While P-CSCF device 122, I-CSCF device 124, S-CSCF device 126, TAS 128 and MRF 132 are depicted as separate devices, in some implementations, the functions of P-CSCF device 122, I-CSCF device 124, and/or S-CSCF device 126 may be implemented in multiple devices or in a single device.

HSS 130 may also include one or more of a variety of computing devices. For example, HSS 130 may include a computer, a server, a cluster of servers, or one or more other types of computing or communication devices. HSS 130 may provide authentication and authorization services with respect to UE devices 110. HSS 130 may operate in a control plane of centralized network 140 and may provide a repository of authorizations, service profiles, preferences, and/or policies relating to centralized network 140. For example, HSS 130 may include identifiers of elements serving UE devices 110, such as gateways 120, S-CSCF devices 126, and/or one or more other devices when UE devices 110 are registered.

When a UE device 110 is turned on or moves into an area covered by the network 140, it registers itself with the network. The registration allows the UE device 110 to bind its public URI to a URI that contains the IP address of the terminal at which the user is logged in. In the registration process, the UE device 110 sends a SIP registration request through the access network 115 and gateway 120 to the P-CSCF 122. Using information contained in the request, the P-CSCF 122 identifies the home network of the UE device 110 and locates an I-CSCF 124 for the UE device 110. The P-CSCF then forwards the registration request to the I-CSCF. The I-CSCF 124 retrieves the profile data for the UE device 110 from the HSS 130 and, if this data indicates that an S-CSCF 126 has been assigned to the UE device 110, sends the registration request to that S-CSCF. If the data from the HSS 130 does not specify a S-CSCF assigned to the UE device 110, the I-CSCF 124 assigns an S-CSCF 126. The S-CSCF 126 is assigned to balance the load in the centralized network 140 so that each of the S-CSCFs in the network 140 serve equal numbers of UE devices 110. The S-CSCF 126 then sends a message to the UE device 110, via a P-CSCF 122 to obtain authentication data from the UE device. The authentication data is compared to the profile data obtained from the HSS 130 and, if verified, a success response is sent to the UE device 110 by the S-CSCF 126 via the P-CSCF 122.

TAS 128 may also include one or more of a variety of computing devices, including a computer, a server, a cluster of servers, or one or more other types of computing or communication devices. TAS 128 may include a back-to-back session initiation protocol (SIP) user agent capable of maintaining call states. Additionally, or alternatively, TAS 128 may provide telephony services that are not directly related to routing network messages. For example, TAS 128 may provide services, such as call waiting, call forwarding, call conferencing, or other types of services relating to telephony services. In some implementations, TAS 128 may not be present.

MRF 132 may also include one or more of a variety of computing devices, including a computer, a server, a cluster of servers, or one or more other types of computing or communication devices. Although not shown, the MRF 132 includes a MRF controller (MRFC) and an MRF processor (MRFP). The MRFC receives signals from an application server and the S-CSCF to control the MRFP. The MRFP provides media-related functions such as voice stream mixing and the playing of tones and announcements. The MRFP may also manage access rights to shared resources. For example, the MRFP may allow audio streams from two or more UE devices to be mixed to implement a conference call feature.

As described below with reference to FIG. 5, the MRF acts as a SIP user agent (UA) to establish a conference call among itself, the UE device 110 and one or more of the UE devices 170a-170n using the gateways 120, P-CSCF processes 122, S-CSCF processes 126 and TAS processes 128 of the centralized networks 140 and 150.

Figure 2:
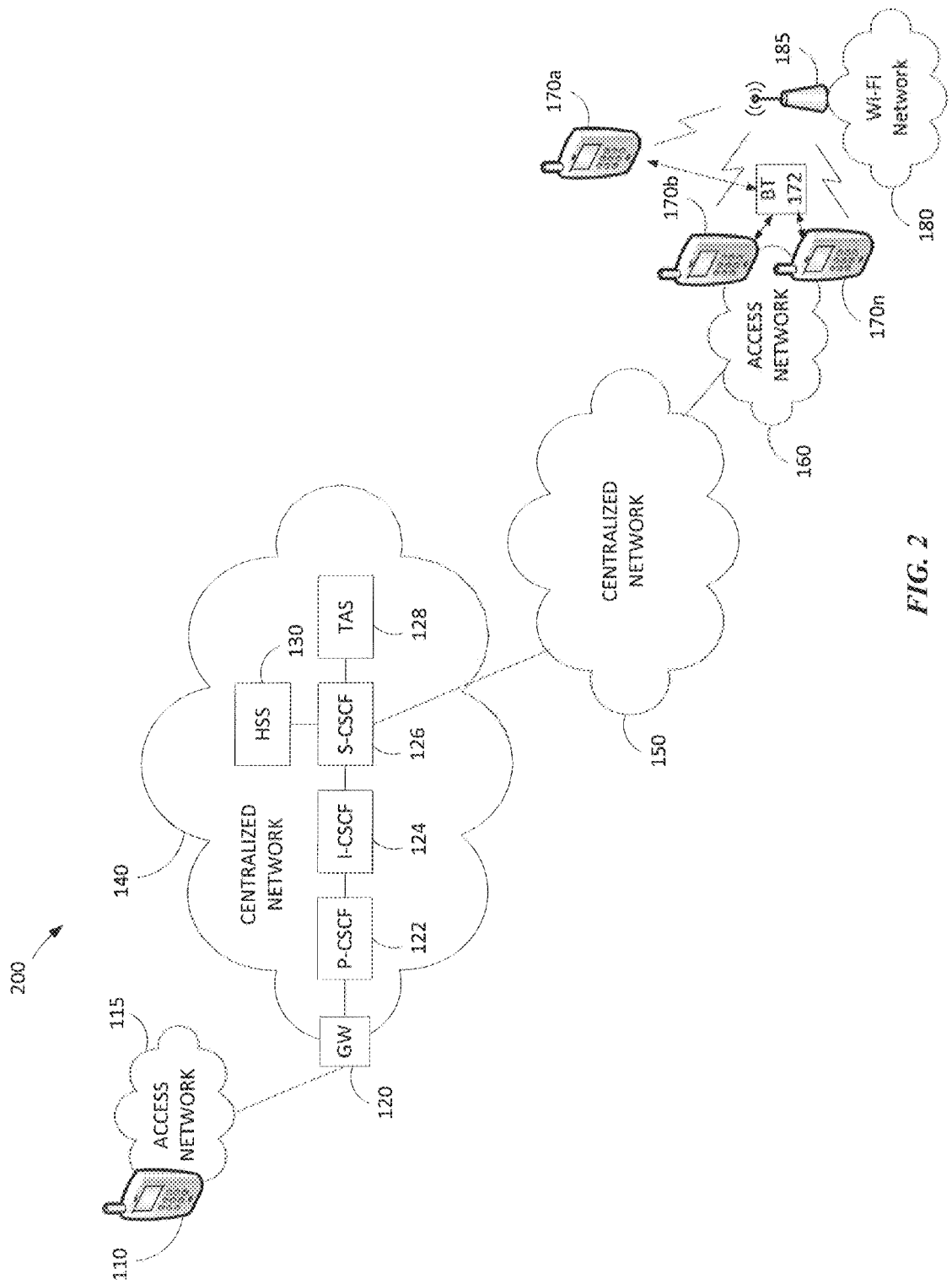
FIG. 2 is a block diagram of a network in which the UE devices include Wi-Fi connectivity.

FIG. 2 is a block diagram of a network environment 200 similar to the environment 100, shown in FIG. 1. Environment 200 does not include the MRF 132 but does include an additional access network 180, which in this example is a Wi-Fi network, having an access point 185 proximate to the UE devices 170a, 170b and 170n. The remaining elements of environment 200 are identical to the corresponding elements of environment 100, shown in FIG. 1. In FIG. 2, the SIP sessions between the UE device 110 on the one hand and the UE devices 170a-170n on the other hand, are established via SIP signaling using the gateways 120, P-CSCFs 122 and S-CSCFs 126 of the centralized networks 140 and 150. In addition, the UE devices 170a-170n are connected by a wireless local area network (WLAN) 180, for example a Wi-Fi network. In this implementation, a call is established between the UE device 110 and one of the UE devices 170a-170n. This call is shared with the other UE devices 170a-170n via the WLAN to implement the handoff of the cordless headset among the devices 170a-170n depending on which device has the best connection with the cordless headset. Details of this implementation are described below with reference to FIG. 6.

FIG. 3 is a diagram of example components of a device 300 that may operate within the environment 100 or 200, shown in FIGS. 1 and 2. Device 300 may correspond to UF device 110 or 170a-170n, gateway device 120, P-CSCF device 122, I-CSCF device 124, S-CSCF device 126, HSS 130, TAS 128 and/or MRF 132. Each of these devices may include one or more devices 300 or one or more components of device 300. Furthermore, although they are shown as separate devices, multiple ones of the devices 120, 122, 124, 126, 128, 130 and 132 may be implemented in a single device 300.

As shown in FIG. 3, device 300 may include bus 310, processor 320, memory 330, input device 340, output device 350, and communication interface 360. However, in other implementations, device 300 may include fewer components, additional components, different components, or differently arranged components than those illustrated in FIG. 3.

Bus 310 may include one or more component subsystems and/or communication paths to enable communications among the components of device 300. Processor 320 may include one or more processors, microprocessors, data processors, co-processors, network processors, application-specific integrated circuits (ASICs), controllers, programmable logic devices (PLDs), chipsets, field-programmable gate arrays (FPGAs), or other types of components that may interpret or execute instructions or data. Processor 320 may control the overall operation, or a portion thereof, of device 300, based on, for example, an operating system and/or various applications. Processor 320 may access instructions from memory 330, from other components of device 300, or from a source external to device 300 (e.g., a network or another device).

Memory 330 may include memory and/or secondary storage. For example, memory 330 may include random access memory (RAM), dynamic RAM (DRAM), read-only memory (ROM), programmable ROM (PROM), flash memory, or some other type of memory. Memory 330 may include a hard disk (e.g., a magnetic disk, an optical disk, a magneto-optic disk, a solid state disk, etc.) or some other type of computer-readable medium, along with a corresponding drive. A computer-readable medium may be defined as a non-transitory memory device. A memory device may include space within a single physical memory device or spread across multiple physical memory devices.

Input device 340 may include one or more components that permit a user to input information into device 300. For example, input device 340 may include a keypad, a button, a switch, a knob, fingerprint recognition logic, retinal scan logic, a web cam, voice recognition logic, a touchpad, an input port, a microphone, a display, or some other type of input component. Output device 350 may include one or more components that permit device 300 to output information to a user. For example, output device 350 may include a display, light-emitting diodes (LEDs), an output port, a speaker, or some other type of output component.

Communication interface 360 may include one or more components that permit device 300 to communicate with other devices or networks. For example, communication interface 360 may include some type of wireless or wired interface. Communication interface 330 may also include an antenna (or a set of antennas) that permit wireless communication, such as the transmission and reception of radio frequency (RF) and/or optical signals. The communications interface 330 may additionally or alternatively support a wired connection, for example, a universal serial bus (USB) or Ethernet connection to a wired network. Thus, the communication interface 360 may include multiple digital transceivers, for communicating with multiple access networks. It may also include a short-range transceiver for communicating with a short-range communications device such as the cordless headset 172.

As described herein, device 300 may perform certain operations in response to processor 320 executing software instructions contained in a computer-readable medium, such as memory 330. The software instructions may be read into memory 330 from another computer-readable medium or from another device via communication interface 360. The software instructions contained in memory 330 may cause processor 320 to perform one or more processes described herein. Alternatively, hardwired circuitry may be used in place of, or in combination with, software instructions to implement processes described herein. Thus, implementations described herein are not limited to any specific combination of hardware circuitry and software.

FIGS. 4A and 4B are block diagram illustrations of exemplary UE devices 400 and 450 that may be used as any of UE devices 110 or 170a-170n. Although each of the UE devices 110, 170a-170n may be a smart-phone or may be incorporated into another device, such as a personal digital assistant (PDA) or the like, for discussion purposes, the illustration shows the UE devices 400 and 450 in the form of a handset. Each of the devices includes a call interface by which calls to other devices may be made and received, a network interface by which communications can be established with, other local UE devices and a short-range communications interface by which communications with short range devices, such as a cordless headset, may be established.

UE device 400 is described first. The handset embodiment of the UE device 400 functions as a normal digital wireless telephone station. For that function, the station 400 includes a microphone 402 for audio signal input and a speaker 404 for audio signal output. The microphone 402 and speaker 404 connect to voice coding and decoding circuitry (vocoder) 406. For a voice telephone call, for example, the vocoder 406 provides two-way conversion between analog audio signals representing speech or other audio and digital samples at a compressed bit rate compatible with the digital protocol of wireless telephone network communications or voice over packet (e.g., Internet Protocol) communications.

For digital communications, the handset 13a also includes at least one digital transceiver (XCVR) 408, an optional wireless network transceiver 432 and a short-range transceiver 434. For purposes of illustration, the wireless network transceiver 432 is shown as a Wi-Fi transceiver and the short-range transceiver 434 as a Bluetooth transceiver. Although not shown, the mobile station 400 may also be capable of analog operation via a legacy network technology. The device may also include a wired digital connection in addition to or in place of the digital transceiver 408. The digital transceiver 408 or wired connection is the call interface through which call data are received by the processor 412. With respect to the system shown in FIG. 1, the device 400 may not include a wireless network transceiver 432 and the transceiver 408 may be the network interface as well as the call interface.

The transceiver 408 provides two-way communication of information, such as vocoded speech samples and/or digital information, in accordance with the technology of the network environments 100 and 200. The transceiver 408 also sends and receives a variety of signaling messages in support of the various voice and data services provided via the UE device 400 and the communication network. Each transceiver 408, 432 and 434 connects through radio frequency (RF) send and receive amplifiers (not separately shown) to a respective antenna 410a, 410b and 410c. It is contemplated, however, that one or more of these antennas may be shared by multiple transceivers The transceiver 408 may also support various types of mobile messaging services, such as short message service (SMS), enhanced messaging service (EMS) and/or multimedia messaging service (MMS). It is contemplated that one or more of the antennas may be replaced by a digital wired connection.

The example UE device 400 includes a display 418 for displaying messages, menus or the like, call related information dialed by the user, calling party numbers, etc. A keypad 420 enables dialing digits for voice and/or data calls as well as generating selection inputs, for example, as may be keyed-in by the user based on a displayed menu or as a cursor control and selection of a highlighted item on a displayed screen. The display 418 and keypad 420 are the physical elements providing a textual or graphical user interface. Various combinations of the keypad 420, display 418, microphone 402 and speaker 404 may be used as the physical input output elements of the graphical user interface (GUI), for multimedia (e.g., audio and/or video) communications. Of course other user interface elements may be used, such as a trackball or other pointing device (not shown), as in some types of PDAs or smart phones.

In addition to normal telephone and data communication related input/output (including message input and message display functions), the user interface elements also may be used for display of menus and other information to the user and user input of selections.

A microprocessor 412 serves as a programmable controller for the UE device 400, in that it controls all operations of the UE device 400 in accord with programming that it executes, for all normal operations, and for operations involved in the location procedure under consideration here and any location or event related communications. In the example, the UE device 400 includes flash type program memory 414, for storage of various "software" or "firmware" program routines and mobile configuration settings, such as mobile directory number (MDN) and/or mobile identification number (MIN), etc. The UE device 400 may also include a non-volatile random access memory (RAM) 416 for a working data processing memory. Of course, other storage devices or configurations may be added to or substituted for those in the example. In a present implementation, the flash type program memory 414 stores firmware such as a boot routine, device driver software, an operating system, cal processing software and vocoder control software, and any of a wide variety of other applications, such as client browser software and short message service software. The memories 414 and 416 also store various data, such as telephone numbers and server addresses, downloaded data such as multimedia content, and various data input by the user. Programming stored in the flash type program memory 414, sometimes referred to as "firmware," is loaded into and executed by the microprocessor 412. Although the microprocessor 412 and memories 414 and 416 are shown as being internal to the UE device 400, it is contemplated that it may be external to the device as may the transceivers 432 and 434.

As outlined above, the UE device 400 includes a processor, and programming stored in the flash memory 414 configures the processor so that the UE device is capable of performing various desired functions, including in this case the functions involved in the location technique and any associated events.

FIG. 4B is a block diagram illustration of an exemplary touch screen type UE device 450. Although possibly configured somewhat differently, at least logically, a number of the elements of the exemplary touch screen type UE device 450 are similar to the elements of UE device 400, and are identified by like reference numbers in FIG. 4B. For example, the touch screen type UE device 450 includes a microphone 402, speaker 404 and vocoder 406, for audio input and output functions, much like in the earlier example. The UE device 450 also includes at least the digital transceivers (XCVRs) 408, 432 and 434, for digital wireless communications. The concepts discussed here encompass embodiments of the UE device 450 utilizing any digital transceivers that conform to current or future developed digital wireless communication standards. As in the station 400, the transceiver 408 provides two-way wireless communication of information, such as vocoded speech samples and/or digital information, in accordance with the technology of the network environments 100 and 200.

As in the example of station 400, a microprocessor 412 serves as a programmable controller for the UE device 450, in that it controls all operations of the UE device 450 in accord with programming that it executes, for all normal operations, and for operations involved in the location procedure under consideration here and any location or event related communications. In the example, the UE device 450 includes flash type program memory 414, for storage of various program routines and mobile configuration settings. The UE device 450 may also include anon-volatile random access memory (RAM) 416 for a working data processing memory. Of course, other storage devices or configurations may be added to or substituted for those in the example. Hence, as outlined above, the UE device 450 includes a processor; and programming stored in the flash memory 414 configures the processor so that the UE device is capable of performing various desired functions, including in this case the functions involved in the location technique and any associated events.

In the example of FIG. 4A, the user interface elements included a display and a keypad. The UE device 450 may have a limited number of keys 430, but the user interface functions of the display and keypad are replaced by a touchscreen display arrangement. At a high level, a touchscreen display is a device that displays information to a user and can detect occurrence and location of a touch on the area of the display. The touch may be an actual touch of the display device with a finger, stylus or other object, although at least some touchscreens can also sense when the object is in close proximity to the screen. Use of a touchscreen display as part of the user interface enables a user to interact directly with the information presented on the display.

Hence, the exemplary UE device 450 includes a display 422, which the microprocessor 412 controls via a display driver (Disp. Dvr.) 424, to present visible outputs to the device user. The UE device 450 also includes a touch/position sensor 426. The sensor 426 is relatively transparent, so that the user may view the information presented on the display 422. A sense circuit (Sense Ctlr.) 428 senses signals from elements of the touch/position sensor 426 and detects occurrence and position of each touch of the screen formed by the display 422 and sensor 426. The sense circuit 428 provides touch position information to the microprocessor 412, which can correlate that information to the information currently displayed via the display 422, to determine the nature of user Input via the screen.

The display 422 and touch sensor 426 (and possibly one or more keys 430, if included) are the physical elements providing the textual and graphical user interface for the UE device 450. The microphone 402 and speaker 404 may be used as additional user interface elements, for audio input and output, including with respect to some location related functions and/or location related events for the user delivered via the UE device.

The structure and operation of the UE devices 400 and 450, as outlined above, are described to by way of example, only.

Figure 5:
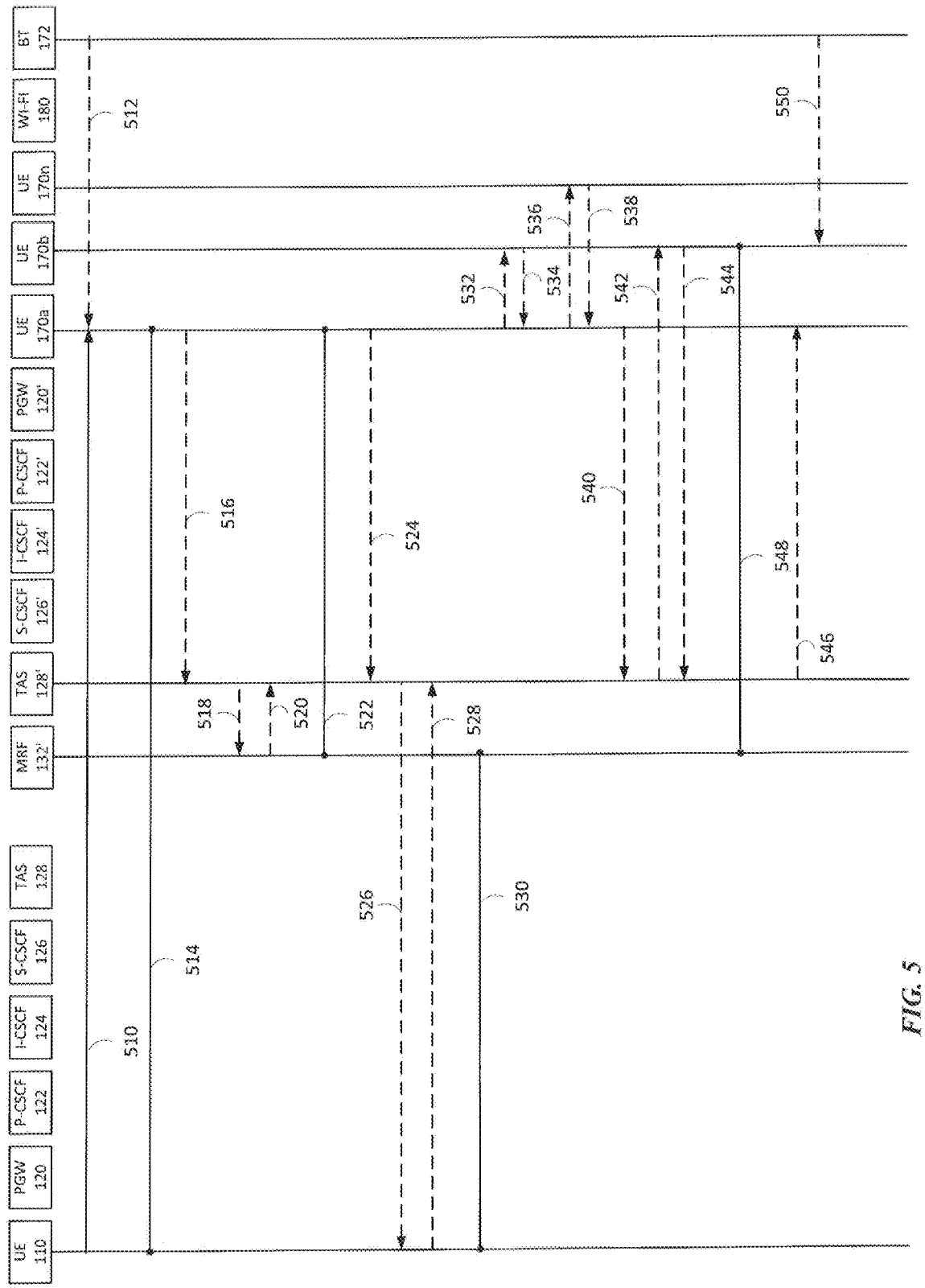
FIG. 5 is a flow diagram of a UE device handoff technique using a cordless headset and a local communication network.

FIG. 5 is a timing flow diagram that is useful for describing an example Bluetooth handoff scheme in the environment shown in FIG. 1. In this example, a caller, employing user equipment (UE) UE device 110 calls a receiver using UE device 170a using the mobile data number (MDN) of device 170a (510). The network environment 100 uses session initiation protocol (SIP) messaging to establish an Internet protocol (IP) voice connection between UE devices 110 and 170a.

As shown in FIG. 5, the network devices PGW 120, P-CSCF 122, I-CSCF 124, S-CSCF 126 and TAS-128 are in centralized network 140 while the network devices PGW 120', P-CSCF 122', I-CSCF 124', S-CSCF 126', TAS-128' and MRF 132' are in centralized network 150. Details of the SIP messaging are described in U.S. pub. no. 2013/0024574 entitled "Communication Session Allocation" to Lau et al. and U.S. pub. no. 2013/00190021 to Lau et al. entitled "Data Path Selection Method For Communication Session," which are incorporated herein by reference. UE device 170a is paired with cordless headset 172 (512) and uses the headset for voice communication. When UE device 170a picks up the call, a point-to-point media path is established between UE devices 110 and 170a.

In this example, the receiver UE device 170a has called or been called by UE device 110 and has an established call session. This may or may not be a SIP session established via the IMS network. The user of the UE device 170a is travelling along with cordless headset 172. Upon arriving at her destination, the user wants to transfer the call to a local telephone, for example, UE device 170b without disconnecting her headset. The destination venue includes several UE devices, 170a, 170b, . . . 170n. As she moves around the venue, she would like to continue to use her cordless headset, switching the end of the point-to-point media path connected to UE device 170a among the devices 170b-170n and concurrently handing off the headset 172 from one of the corresponding UE device, depending on which UE device 170a-170n has the best connection to the cordless headset 172. Whether a connection is the "best" connection may be determined using a variety of metrics. The best connection, may be the one having the greatest signal strength (e.g. received signal strength indication (RSSI)), the least latency and/or the highest quality of service (QoS). In addition, to prevent unnecessary switching, there may be hysteresis in the measurements such that the metric or metrics measured to determine the "best" connection exceeds the metric or metrics of the current connection by more than a threshold value before the handoff will occur.

In the example shown in FIG. 5, to implement this handoff, an application running on UE device 170a signals the TAS 128' to request the MRF 132' to set up an IMS conference between the UE device 170a and the MRF 132'. Because the UE device 170a has been moving, it may not be registered with the network 150. A first step in the process is to register the device, as described above. Once it is registered, in one implementation, the UE device 170a sends a SIP message to the P-CSCF 122' via the access network 160 and gateway 120'. The P-CSCF then sends the SIP message to the S-CSCF 126' which, in turn, passes the message to the TAS 128' (516). The message is a request for the MRF to establish an IMS conference call. In response to this message, the TAS 128' accesses the HSS (not shown) of the network 150 to determine if UE device 170a is authorized to set up an IMS conference call. The TAS 128' then sends a SIP message to the MRF 132' (518). In response to this request, the MRF 132', acting as a user agent (UA), sends a SIP invite for the UE device 170a to the S-CSCF 126' via the TAS 128' (520). The S-CSCF 126' accesses the HSS of the network 150 to determine that this action is within the profile for UE device 170a and then signals both the MRF 132' and the UE device 170a to establish the voice connection. (522).

Next, the application running on UE device 170a signals the TAS 128' to invite the caller, using UE device 110, to join the established conference (524). In one implementation, the UE device 170a sends a SIP request to the TAS 128' via the S-CSCF 126'. The TAS 128' then sends the SIP invite to the MRF 132' which, acting as a SIP UA, forwards the message to the UE device 110 via the S-CSCF 126', S-CSCF 126, P-CSCF 122, gateway 120 and access network 115 (526). The UE device 110 reverses this process to send an SIP reply message back to the MRF 132' (528) to join the conference call (530). After the UE device 110 joins the conference call, the direct channel (514) between the UE devices 110 and 170a is broken.

The application running on UE device 170a then communicates with other UE devices, 170b-170n, in the venue to determine which device that is not currently engaged in a call can establish the best connection to the headset 172. In one implementation, this communication may establish separate SIP sessions between UE device 170a on the one hand and each of the UE devices 170b-170n on the other hand. These SIP sessions may be established by sending SIP messages requesting information on the signal strength or latency of the connection with the cordless headset from UE device 170a to each of the UE devices 170b-170n through the P-CSCF 122' and S-CSCF 126' under control of the TAS 128' (532, 536). The UE devices 170b-170n then respond (534, 538) to the request by providing the requested data through the S-CSCF 126' and p-CSCF 122'. Alternatively, the UE devices 170a 0 170n may exchange this information via messages, such as short message service (SMS) messages.

In this example, device 170b is determined to be able to support the best connection. The application running on UE device 170a then signals TAS 128' to request that UE device 170b join the conference (540). UE device 170a sends a SIP message to the TAS 128' and MRF 132', as described above, requesting that the MRF invite UE device 170*b* to join the conference call, MRF 132, acting as a SIP UA then sends the invite request to UE device 170*b* via the TAS 128', S-CSCF 126', P-CSCF 122' and gateway 120' (542) and, when the request is accepted (544) UE device 170*b* joins the conference call. UE devices 110, 170*a* and 170*b* are participating in the conference at this point (548). The application running on UE device 170*a* communicates with a corresponding application running on UE device 170*b* via SIP messaging requesting UE device 170*b* to establish a short-range connection with the cordless headset 172 (550). Once the connection between the short-range headset 172 and the UE device 170*b* is established, the application on UE device 170*b* communicates with the TAS 128' and requests that UE device 170*a* end its participation in the conference call. At this point, UE device 170*a* leaves the conference call and UE device 170*b* continues the call using the headset 172. Thus, in this example, the network interface by which the UE device 170*a* communicates with the device 170*b* is the same as the communications interface by which UE device 110 communicates with device 170*a*.

Rather than inviting an idle UE device when a better short-range communication is detected, it is contemplated that the system may invite all of the UE devices 170*b*-170*n* to join the conference call when device 170*a* enters the venue or receives a call in the venue. The conference call may have a separate channel to which any of the devices 170*b*-170*n* may connect in order to accept the handoff from the UE connected to headset 172.

Figure 6:
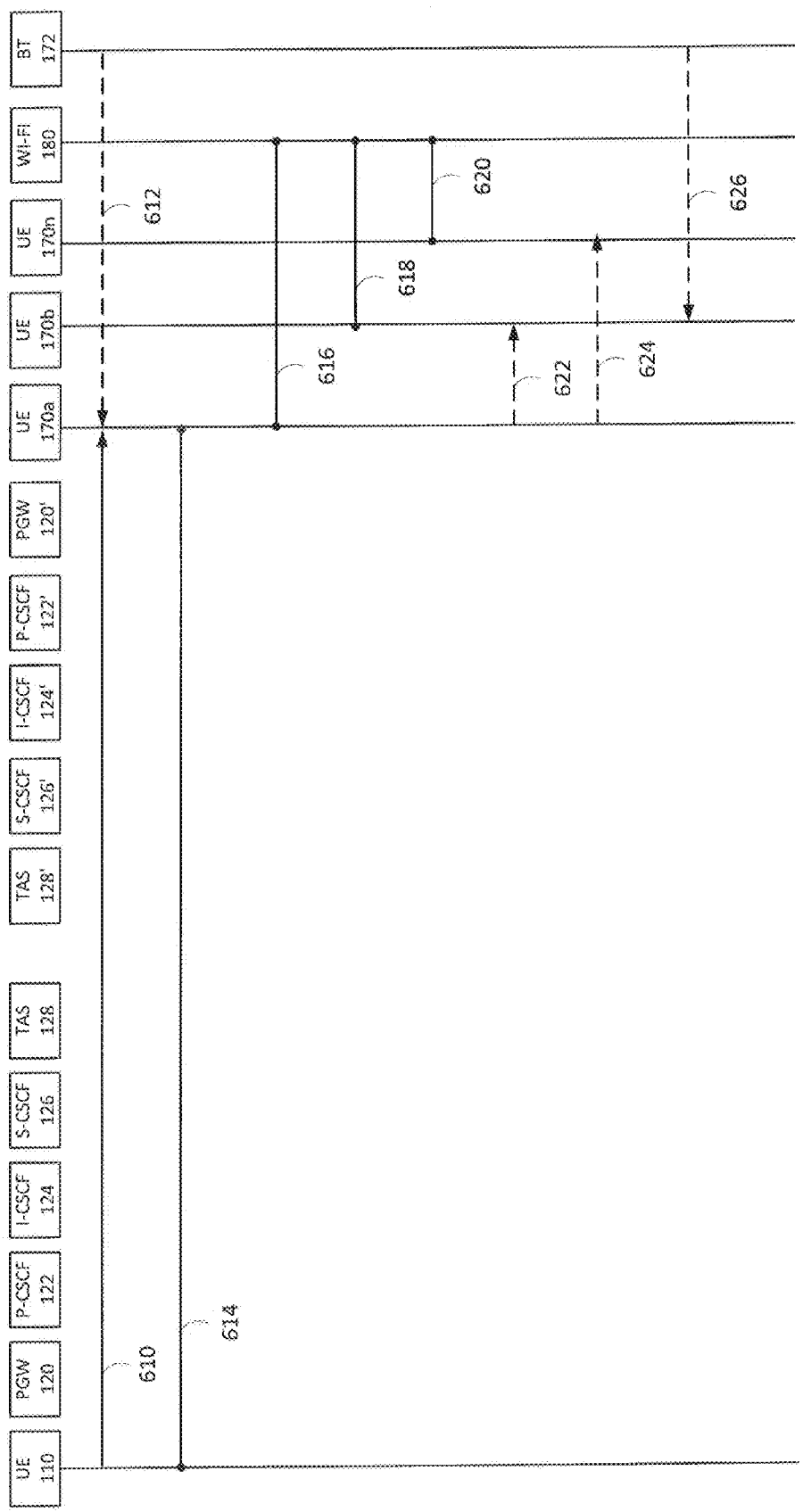
FIG. 6 is a flow diagram of a UE device handoff technique using the media resource function of an IMS network.

FIG. 6 is a timing flow diagram that illustrates another embodiment in which the UE devices 170*a*-170*n* are able to communicate locally via an access network 180 using one or more access points 185. In this example the local access network 180 is a Wi-Fi network.

As in the embodiment described above with reference to FIG. 5, the caller uses SIP signaling to establish an IP voice connection between the UE devices 110 and 170*a* (610). If both of the UE devices 110 and 170*a* are registered with the respective centralized networks 140 and 150, UE device 110 may open a communications channel with UE device 170*a* to establish the IP voice connection. To do this, the UE device 110 sends an SIP invite request through the access network 115 and the gateway 120 to the P-CSCF 122. P-CSCF 122 retrieves the subscriber profile for the UE device 110 from the HSS 130. The P-CSCF 122 then determines the service logic for the IP telephone connection and applies the service logic to the TAS 128. The P-CSCF 122 then determines if the called UE device 170*a* is in the same network as the calling device 110. In the example shown in FIG. 1, the devices are in different networks. In this instance, the P-CSCF 122 identifies I-CSCF 124' of the centralized network 150 which is the home network of the UE device 170*a*. The I-CSCF 124' then determines the S-CSCF 126' that controls the UE device 170*a* by querying the HSS (not shown) of the centralized network 150. The S-CSCF 126 then forwards the invite request to the S-CSCF 126' which retrieves the subscriber profile data for UE device 170*a* from the HSS (not shown) of the centralized network 150. Based on this profile data, the S-CSCF applies the service logic to the TAS 128' which establishes a session between the UE devices 110 and 170*a* through the S-CSCF 124', P-CSCF 122', gateway 120' and access network 160.

Device 170*a* is paired with cordless headset 172 and uses it for voice communication. When the recipient arrives at her destination, an application running on the device 170*a* senses the access network 180 and signals UE devices 170*b*-170*n* of a pending broadcast of the voice communication by UE device 170*a* via the Wi-Fi network 180 (616, 618, 620) To establish a shared Wi-Fi voice channel among all of the devices 170*a*-170*n*. This connection may be a Wi-Fi Direct network connection or an Ad-Hoc network connection. The application on UE device 170*a* then begins broadcasting the voice communication for example, via https protocol, to the other UE devices 170*b*-170*n*. This broadcast may be in an available Wi-Fi channel, selected when the connections among the devices 170*a*-170*n* are established. Applications running on UE devices 170*b*-170*n* then begin monitoring the strength and latency of their connections to the cordless headset 172 and provide the information to each other through the network, for example, by SMS messages or by a transmission in the shared channel or in a second channel. This second channel may be established in the same way as the Wi-Fi voice channel, using a different IP address. As only a limited amount of data is transferred in the second channel, it may be established with a lower bandwidth and lower QoS than the voice channel. Alternatively, instead of establishing a shared second channel, the UE device 170 currently coupled to the coreless headset 172 may periodically poll each of the other UE devices 170 to request measurement of the signal strength or latency of the Bluetooth connection. When application running on UE device 170*a* determines that the strength, latency or QoS of the short-range connection is less than that of another UE device it initiates a handoff of both the call and the cordless headset 172. The call handoff may, through messaging over the access network 180, instruct the application running on the other UE device to access the broadcast stream. The application running on UE device 170*a* then hands off the cordless headset 172 to the identified UE device (626). As the recipient moves around the venue, this process may be repeated with other ones of the UE devices 170*a*-170*n* while the recipient maintains continuous IP voice session through the cordless headset 172.

In each of the examples described above, a user having a cordless headset 172, such as a Bluetooth device, is in an venue having multiple wireless or wired IP telephone devices 170*a*, 170*b*, ... 170*n*. Each of the telephone devices is able to be paired with the cordless headset 172. Each of the telephone devices 170*a*-170*n* is running an application that monitors the signal strength and latency of signals from the cordless headset 172 and each of the UE devices 170*a*, 170*b*, ... 170*n* that is within range of the cordless headset 172. Alternatively, the application running on one of the UE devices, for example, the one that was first called, may poll the other devices or may use the shared voice channel or the shared second channel to determine which of the UE devices 170*a*-170*n* has the best connection to the cordless headset 172. If the cordless headset 172 is currently communicating through telephone device 170*a* and the application running on device 170*a* determines that signal strength or latency between the cordless headset 172 and another one of the telephone devices, 170*b*, is better than that of device 170*a*, the device 170*a* initiates a call handoff, as described above, and hands off the cordless headset 172 from device 170*a* to device 170*b*.

When call handoff, as described above is initiated in any direction amongst UE devices 170*a*, 170*b*, ... 170*n*, the cordless handset 172 is handed off from one of the devices 170*a*, 170*b*, ... 170*n* to another one of the devices 170*a*, 170*b*, ... 170*n* in a broadcast configuration over the access network 180, the call control functions may be passed, via the UE application running on the UE device to which the headset 172 is currently bound, to the UE device that is broadcasting the media to all of the other UE devices 170*a*, 170*b*, ... 170*n*.

FIG. 7A is a flow-chart diagram of an application program running on a UE device 170*a* that is engaged in a telephone call. The UE device 170*a* determines the signal strength and latency of the cordless headset 172 used with the device 170*a* on the call (702). Next, the application obtains the signal strength and latency of the cordless headset 172 to each of the other devices 170b-170n that are within range of the headset 172 (704). This information may be obtained by messaging among the devices using the IMS network or a local access network through which the UE devices are connected to each other. The device 170a may request the information from each of the other UE devices or each device may periodically broadcast information on any cordless headsets that are in range, to all of the other UE devices.

After UE device 170a determines the relative strengths of connection of the other UE devices (706), it may transfer the call. If, for example UE device 170b receives the signals from the cordless headset 172 with a stronger signal and/or lower latency, the application running on UE device 170a implements one of the handoff schemes described above with reference to FIGS. 5 and 6 to initiate handoff or transfer of the call from UE device 170a to device 170b and then handoff of the cordless headset 172 from device 170a to device 170b (708).

FIG. 7B is a flowchart diagram of the application when the UE device is not engaged in a telephone call. The application running on an idle device periodically checks the status of all cordless headsets that are within range, determining their respective signal strengths and latencies (720). When the idle device receives a request from another UE device, the idle device sends the measured parameters of the cordless headset or headsets. Alternatively, the idle UE device may periodically broadcast this information to all of the other UE devices or may periodically transmit the information to the UE device currently communicating via the cordless headset 172. As described above, the requesting UE device uses these measurements to determine whether the cordless device—and the telephone call—should be handed off to the idle device.

The examples above assume that a UE device is already engaged in an IP telephone call and determines that another UE device has a better connection with the cordless headset. Either UE device 110 or one of the UE devices 170a-170n may initiate the call. If is noted, however, that the called UE device does not need to be the device that currently has the best connection to the cordless headset. For example, UE device 110 may initiate a call to UE device 170n while the user, with the cordless headset, is proximate to UE device 170a. When the connection is made, UE device 170n communicates with UE device 170a and determines that the cordless headset has the best connection to that device. The application running on UE device 170n then initiates the handoff of the call to device 170a. This may be accompanied by a special ring or other audible signal on the device 170a to indicate that the call has been handed off from another UE device. The special ring may indicate a Bluetooth handoff from any other device or there may be a different special ring for handoff from each UE device.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain implementations may involve a component that performs one or more functions. These components may include hardware, such as an ASIC or a FPGA, or a combination of hardware and software.

Even though particular combinations of features are recited in the claims and/or disclosed in the specification, these combinations are not intended to limit disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential to the implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device comprising:
a call interface that receives call data from and provides call data to a first other device;
a network interface through which a communication channel is established with a second other device;
a short-range communication interface through which data is communicated between the device and a short-range communication device; and
a processor coupled to a non-transient compute readable medium, the computer readable medium including programming instructions which cause the processor to:
process the call data received through the call interface to establish a first communication channel between the device and the first other device;
control the network interface to establish a second communication channel between the device and the second other device and to provide the call data to the second other device via the second communication channel;
determine at least one of relative strength, latency or quality of service (QoS) of respective connections between the short range communication device and the device and between the short range communication device and the second other device; and
when the short range communication device is determined to have a better connection with the second other device than the short range communication device has with the device, transfer the call data to the second other device and concurrently hand off the short range communication device to the second other device.

2. The device of claim 1, wherein the programming instructions cause the processor to hand off the short range communication device to the second other device by signaling the second other device to use the short range communications device and cause the short range communications interface to terminate communications with the short range communications device.

3. The device of claim 1, wherein the network interface is a wireless local area network (WLAN) interface and the programming instructions cause the processor to establish a conference call between the device and the second other device by transferring the call data between the device and the second other device over the WLAN via the second communication channel.

4. The device of claim 3, wherein the programming instructions cause the processor to determine the at least one of relative strength, latency or QoS of the connection between the short range communication device and the second other device by sending the second other device a request for at least one of connection strength, latency or QoS information of the connection between the short range communication device and the second other device via the WLAN interface and receiving a response to the request from the second other device.

5. The device of claim 4, wherein the programming instructions cause the processor to establish a third communication channel between the device and the second other device via the WLAN to request at least one of connection strength, latency or QoS information of the connection between the short range communication device and the second other device, the third communication channel being different from the second communication channel.

6. The device of claim 3, wherein the programming instructions cause the processor to transfer the call data to the second other device by signaling the second other device to access the second communication channel to participate in the conference call.

7. The device of claim 1, wherein the programming instructions cause the processor to signal the second other device to provide an audible signal indicating the transfer of the call data to the second other device.

8. The device of claim 1, wherein the call interface includes an interface to an Internet protocol (IP) multimedia subsystem (IMS) network and the programming instructions cause the processor to send a message through the IMS network to a media resource function (MRF) coupled to the IMS network to establish a conference call between the device and the first other device.

9. The device of claim 8, wherein the network interface includes the IMS interface and the programming instructions cause the processor to establish the second communications channel by sending a message to the MRF to add the second other device to the conference call between the device and the first other device.

10. The device of claim 8, wherein the device determines at least one of the strength, latency or QoS of the connection between the short range communication device and the second other device using a third communication channel established between the device and the second other device via the network interface established to exchange data on signal strength or latency of the connection between the short range communications device and the second other device.

11. A method comprising:
receiving, via a first communication channel, call data from a first device and communicating with the first device using a short range communications device;
establishing a second communication channel with a second device and providing the call data to the second device via the second communication channel;
determining at least one of a first strength, latency or QoS of a first connection to the short range communication device and at least one of a second strength, latency or QoS of a second connection between the second device and the short range communication device; and
when the at least one of the second strength, latency or QoS of the second connection is determined to be better than the at least one of the first strength, latency or QoS, transferring the call data to the second device and concurrently handing off the short range communication device to the second device.

12. The method of claim 11, wherein the handing off of the short range communication device to the second device includes signaling the second device to use the short range communications device and terminating communications with the short range communications device.

13. The method of claim 11, wherein the establishing of the second communications channel includes communicating with the second device using a wireless local area network (WLAN) and establishing a conference call between the device and the second device by transferring the call data between the device and the second device over the WLAN via the second communication channel.

14. The method of claim 13, further including passing call control functions from the first UE device to the second UE device via respective applications running on the first and second UE devices, wherein the respective applications communicate via the WLAN using the second communications channel and wherein the applications are configured to terminate the communications between the first and second UE devices using the WLAN after the call control functions are transferred.

15. The method of claim 13, wherein the determining of the at least one of the second strength, latency or QoS of the second connection includes sending the second device a request for the at least one of the connection strength, latency or QoS of the second connection information via the WLAN and receiving a response to the request from the second device.

16. The method of claim 15, further including establishing a third communication channel between the device and the second device via the WLAN to request the at least one of the connection strength, latency or QoS of a third connection between the short-range communications device and the second device, the third communication channel being different from the second communication channel.

17. The method of claim 13, wherein the transferring of the call data to the second device includes signaling the second device to access the second communication channel to participate in the conference call.

18. The method of claim 11, wherein the receiving of the call data from the first device includes sending a message through an Internet protocol (IP) multimedia subsystem (IMS) network to a media resource function (MRF) coupled to the IMS network to establish a conference call with the first device.

19. The method of claim 18, wherein the establishing of the second communications channel includes sending a message to the MRF to add the second device to the conference call with the first device.

20. The method of claim 18, wherein the determining of the at least one of the strength, latency or QoS of the connection between the short range communication device and the second device includes establishing a third communication channel with the second device, different from the first and second communications channels wherein the third communication channel is established to exchange data on signal strength, latency or QoS of the connection between the short range communications device and the second device.

* * * * *